United States Patent [19]

Hashimoto

[11] Patent Number: 5,781,552
[45] Date of Patent: Jul. 14, 1998

[54] AUTOMATIC ADDRESS SETTER CAPABLE OF DETERMINING A NETWORK ADDRESS OF A HOST STATION

[75] Inventor: Akira Hashimoto, Tokyo, Japan

[73] Assignee: NEC Corporation, Tokyo, Japan

[21] Appl. No.: 404,988

[22] Filed: Mar. 16, 1995

[30] Foreign Application Priority Data

Mar. 16, 1994 [JP] Japan .................................. 6-072667

[51] Int. Cl.⁶ ...................................................... H04J 3/24
[52] U.S. Cl. ............................................ 370/447; 370/471
[58] Field of Search ................................... 370/85.1, 85.2,
370/94.1, 60, 60.1, 94.2, 85.13, 92, 93,
25.7, 95.3, 95.1, 91, 241, 245, 247, 389,
455, 449, 450, 447, 445, 444, 443, 461,
471, 475, 474, 908; 375/311, 317

[56] References Cited

U.S. PATENT DOCUMENTS

| 5,150,464 | 9/1992 | Sidhu et al. | 395/200.1 |
| 5,400,333 | 3/1995 | Perlman | 370/256 |
| 5,440,547 | 8/1995 | Easki et al. | 370/397 |
| 5,440,558 | 8/1995 | Ban | 370/85.1 |
| 5,440,698 | 8/1995 | Sindhu et al. | 370/85.2 |

FOREIGN PATENT DOCUMENTS

| 1-125141 | 5/1989 | Japan . |
| 2-222336 | 9/1990 | Japan . |

*Primary Examiner*—Dang Ton
*Attorney, Agent, or Firm*—Sughrue, Mion, Zinn, Macpeak & Seas, PLLC

[57] ABSTRACT

In a method of determining an assigned network address of a host station connected to a local area network, a predetermined routing information signal, such as an RIP packet, which is periodically received by the host station is monitored to detect an unused network address in the local area network. On detection of the unused network address, a request signal is transmitted to the local area network with the unused network address attached to the request signal to monitor presence or absence of a response signal to the request signal and to determine the assigned network address of the host station when the response signal is absent.

9 Claims, 6 Drawing Sheets

| DESTINATION NETWORK ADDRESS REGION | NEXTHOP NETWORK ADDRESS REGION | INTERFACE REGION | METRIC REGION |
|---|---|---|---|
| 133.200.1.1 | DIRECT | intf-1 | 1 |
| 133.200.2.1 | 133.200.1.199 | intf-1 | 2 |
| 133.200.1.5 | DIRECT | intf-1 | 1 |
| 133.200.1.10 | DIRECT | intf-1 | 1 |
| 133.200.3.1 | 133.200.1.99 | intf-1 | 3 |
| 133.200.1.7 | DIRECT | intf-1 | 1 |
| 133.200.1.99 | DIRECT | intf-1 | 1 |
| 133.200.1.199 | DIRECT | intf-1 | 1 |

FIG. 4

| DESTINATION NETWORK ADDRESS REGION 106a | DESTINATION MAC ADDRESS REGION 106b |
|---|---|
| 133. 200. 1. 1 | 00004c000001 |
| 133. 200. 1. 5 | 00004c000002 |
| ⋯ | ⋯ |
| 133. 200. 1. 10 | 00004c000003 |
| 133. 200. 1. 7 | 00004c000004 |
| 133. 200. 1. 99 | 00004c000005 |
| 133. 200. 1. 199 | 00004c000006 |

AUTOMATIC ADDRESS SETTER CAPABLE OF DETERMINING A NETWORK ADDRESS OF A HOST STATION

BACKGROUND OF THE INVENTION

This invention relates to an automatic network address setter or setting circuit and a method for use in determining a network address in a host station, such as a work station, a terminal, a computer, a router, and the like, connected to a local area network (LAN).

In general, such an automatic network address setter has been used to determine each address of host stations connected to a local area network, when a network is designed or changed by connecting new host stations to the LAN.

To this end, a proposal has been made about a conventional method in which each address of each host station is determined one by one by an operator or designer each time when each host station is connected to the local area network. This method is disadvantageous in that the addresses are very often wrongly set to the host stations because the addresses are determined by the operator or a designer. In addition, such operation of determining the addresses is very troublesome.

In order to solve this problem, another method has been disclosed in Japanese Unexamined Patent Publication No. Hei 1-125,141, namely, 125,141/1989. In this method, a host station to which an address is to be allocated transmits an address confirmation packet to the network and receives an address response packet which is representative of previous allocation of the address in question. Thereafter, detection is successively made about whether or not the address response packet is received and about whether or not an unused or an idle address is present. If an idle address is present, the idle address is determined as its own address of the host station in question.

With this method, the address confirmation packet which includes an address number is successively transmitted from the host station. The address number in the address confirmation packet should be changed in the order from a small address number to a large one as long as the address response packet does not indicate an idle address. Therefore, transmission of such an address confirmation packet should be continued until an idle address is indicated by the address response packet. From this fact, it is readily understood that a long time is required until determination of an idle address.

Alternatively, a network address setting method has been also disclosed in Japanese Unexamined Patent Publication No. Hei 2-222,336, namely, 222,336/1990. In this method, an address interrogation packet is transmitted from a host station in a network to an address server. The address server notifies the host station under consideration of an idle address. The idle channel is memorized as its own address in the host station.

With this method, a plurality of usable addresses should be prepared and should be memorized or registered in the address server.

SUMMARY OF THE INVENTION

It is an object of this invention to provide an automatic network address setter which is capable of automatically assigning a network address to a host station within a short time without preparing an address server.

It is another object of this invention to provide a method which is capable of quickly determining the network address of each host station.

2

It is still another object of this invention to provide a method of the type described, which is applicable to a network system which includes a plurality of local area networks connected through routers to one another.

A network address automatic setting circuit to which this invention is applicable is included in a host station connected to a local area network to allocate its own network address to the host station. According to an aspect of this invention, the automatic setting circuit comprises routing information reception means for receiving a routing information signal transmitted through the local area network, memory means for memorizing the routing information signal received through the routing information reception means, extracting means for extracting an unused address on the basis of contents of the memory means as an extracted address, confirming means for confirming whether or not a host station of the extracted address is present, and determining means for determining the own network address on the basis of a result of the confirmation.

According to another aspect of this invention, a method is provided for use in determining an assigned network address of a host station connected to a local area network and comprises the steps of monitoring a predetermined routing information signal which is periodically sent from the local area network and which carries routing information of the local area network, selecting an unused network address on the basis of the predetermined routing information signal received, and deciding the assigned network address on the basis of the unused network address.

BRIEF DESCRIPTION OF THE DRAWING

FIG. 4 shows contents of a routing table illustrated in FIG. 1;

FIG. 5 shows contents of an ARP table also illustrated in FIG. 1; and

DESCRIPTION OF THE PREFERRED EMBODIMENTS

Figure 1:
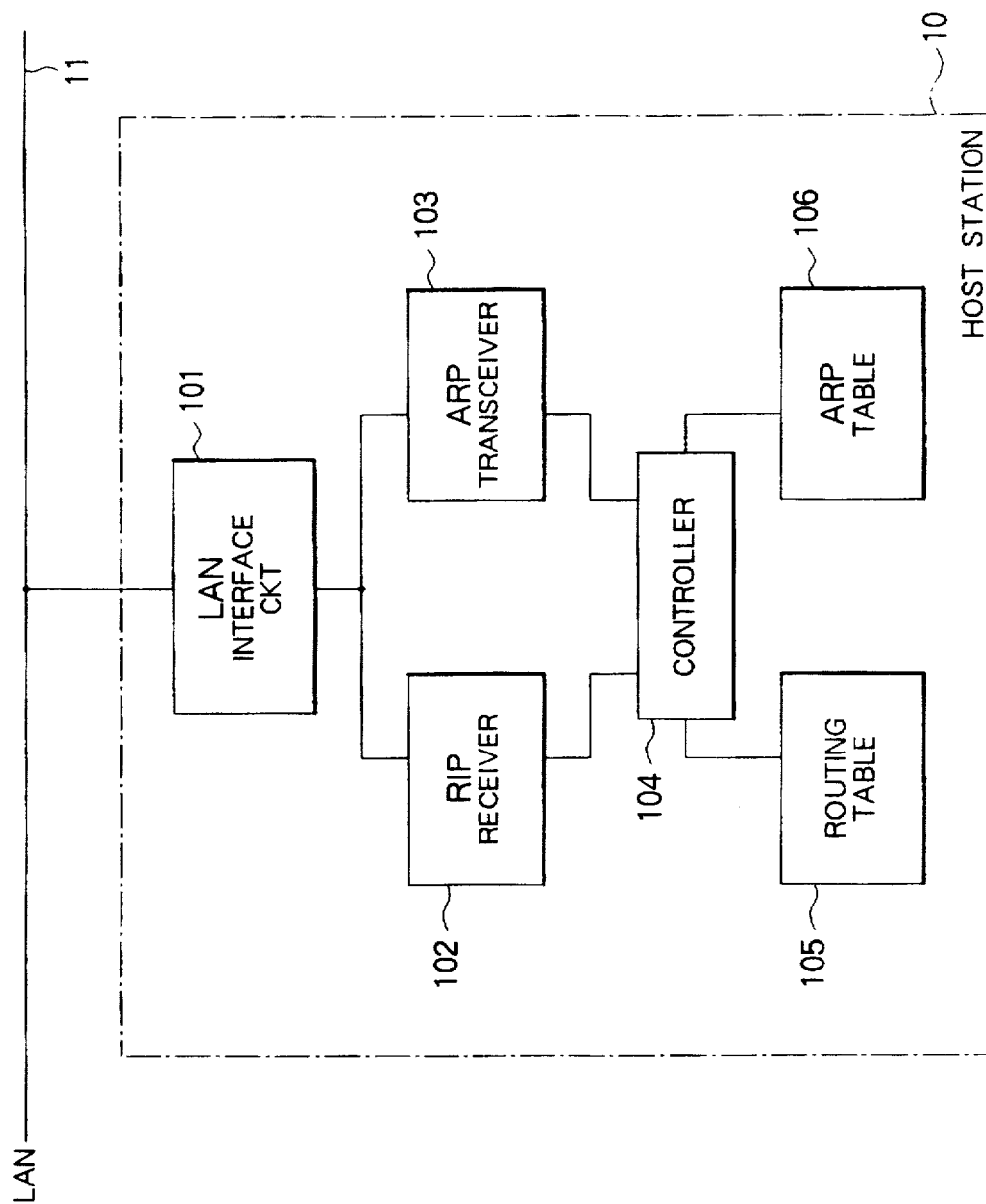
FIG. 1 is a block diagram of a host station which is operable as an automatic network address setting circuit.

Referring to FIG. 1, an automatic network address setter according to a preferred embodiment of this invention is included in a host station 10 which is connected to a local area network (LAN) 11.

Herein, it is assumed that a plurality of host stations, such as the host station 10, are connected to the LAN 11 and that dynamic routing control is adopted to all of the host stations connected to the LAN 11 and is actually executed by the use of a routing information protocol (RIP) known in the art. The LAN 11 may be connected to another LAN (not shown) through a router or routers. Such routers may be considered as a type of host station.

In addition, it is to be noted in connection with the routing information protocol (RIP) that a routing information protocol (RIP) response packet is periodically or regularly produced from the host stations, such as the routers, and includes a routing information signal which specifies a metric between the own station and host stations which are connected to the LAN 11 and which is communicated with the own station. For example, the RIP response packet is produced from each host station at every time of, for example, thirty seconds. In any event, the RIP response packet may be collectively referred to as a predetermined routing information signal.

Moreover, an address resolution protocol (ARP) is used in the LAN 11 to transmit or receive a network address, namely, an address assigned to each of the host stations, as will become clear later as the description proceeds. It suffices to say for the time being that an ARP request packet and an ARP response packet are transmitted through the LAN 11.

Briefly, the host station is operable in accordance with the RIP and the ARP, as mentioned above. In order to structure the automatic network address setter used in the host station operated in accordance with the RIP and the ARP, the illustrated host station 10 comprises a LAN interface circuit 101 connected to the LAN 11, a routing information protocol (RIP) receiver 102 connected to the LAN interface circuit 101, an address resolution protocol (ARP) transceiver 103 also connected to the LAN interface circuit 101, and a controller 104 connected to both the RIP receiver 102 and the ARP transceiver 103.

In the illustrated example, the host station 10 further comprises a routing table 106 and an ARP table 106 both of which are connected to the controller 104. The routing table 106 memorizes, as contents, routing information signals which are renewed in accordance with a state of the network. On the other hand, the ARP table 106 successively memorizes addresses assigned to the host stations connected to the LAN 11.

In operation, let the RIP response packet be received at the LAN interface circuit 101 through the LAN 11. Contents of the RIP response packet is sent from the LAN interface circuit 101 through the RIP receiver 102 and the controller 104 to be memorized into the routing table 105.

When any change takes place in the network, contents of the routing table 105 are updated or renewed in accordance with the change in the network at a predetermined time interval of, for example, thirty seconds.

Therefore, it is possible to know a shortest communication route in the host station 10. On the other hand, the controller 104 can detect an unwritten network address by monitoring the contents of the routing table 105.

Therefore, the controller 104 determines one of the unwritten network addresses as an idle address to enable the ARP transceiver 103. In this event, the idle address is indicated as a target address by the controller 104. As a result, the ARP transceiver 103 transmits, to the LAN 11, an ARP request packet which includes the idle address as the target address.

Such transmission of an ARP request packet serves to judge whether or not a host station is present which has the network address corresponding to the idle address.

Specifically, when an ARP response packet is received by the ARP transceiver 103, an address indicated by the received ARP response packet is stored in the ARP table 106. Thereafter, the controller 104 determines, as an idle address, an unwritten network address which is not written into the routing table 105 and makes the ARP transceiver 103 transmit an ARP packet which includes the idle address as a target address.

On the other hand, let no ARP response packet be received by the ARP transceiver 103 within a predetermined duration.

No reception of any ARP response packet indicates that any host station which has the network address corresponding to the idle address is not present in the network. Therefore, the controller 104 determines the idle address as an assigned address to the host station 10.

Figure 2:
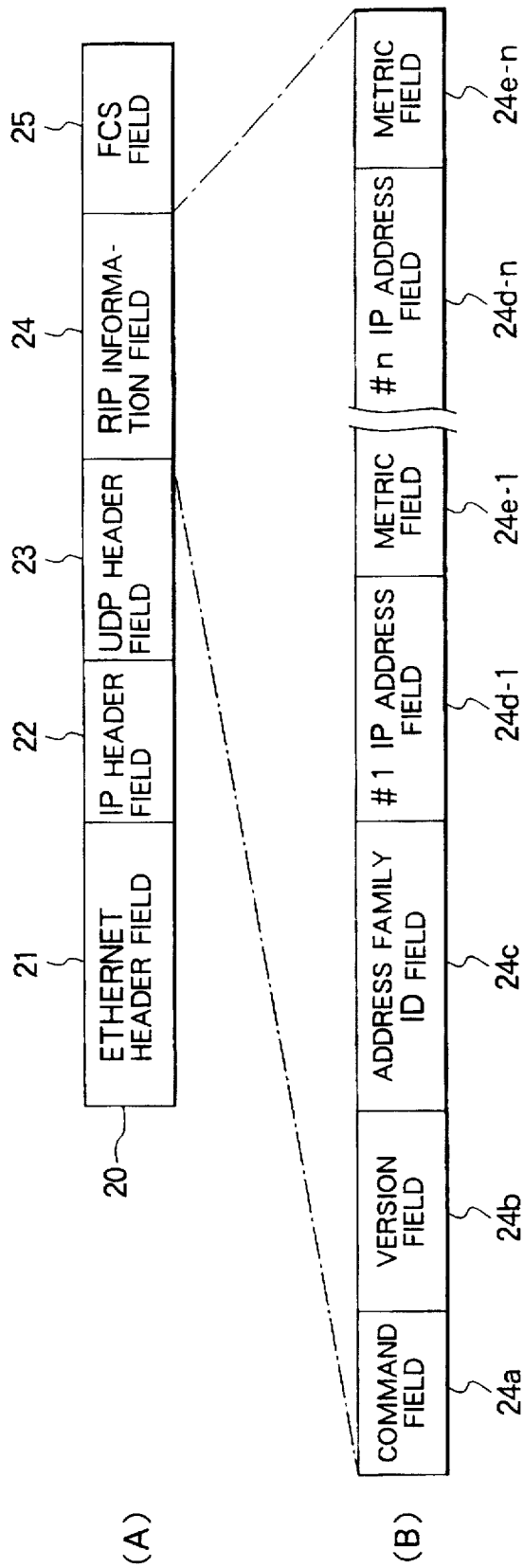
FIGS. 2(A) and 2(B) show formats for use in describing a routing information protocol (RIP) packet.

Taking the above into consideration, description will be made in detail in connection with the preferred embodiment of this invention. The host station 10 illustrated in FIG. 1 is supplied with the RIP response packet 20 which is illustrated in FIGS. 2(A) and (B). The illustrated RIP response packet comprises an Ethernet header field 21, an Internet Protocol (IP) header field 22, a User Datagram Protocol (UDP) header field 23, an information field 24 for the RIP (namely, an RIP information field), and a Frame Check Sequence (FCS) field 25.

As known in the art, the Ethernet header field 21 is for arranging an information signal sequence which is used to establish communication on the second layer, namely, the data link layer in the seven layer model of Open Systems Interconnection (OSI). Such an information signal sequence arranged in the Ethernet header field 21 forms a frame which includes a destination address, an originating address, a protocol type, and so forth.

On the other hand, the IP header field 22 is for arranging an information signal sequence which is used to establish communication on the third layer, namely, the network layer and which forms a frame including a destination internet (IP) address, a sender IP address, a service type, a datagram length, an upper protocol, and so on. In addition, the UDP header field 23 is for arranging an information signal sequence which is used to establish communication on the fourth layer, namely, the transport layer and which forms a frame including a destination port number, a sender port number, a datagram length, and the like.

Furthermore, the RIP information field 24 is composed of a command field 24a, a version field 24b, an address family ID field 24c, #1–#n IP address fields 24d–1 to 24d–n, and the corresponding metric fields 24e–1 to 24e–n, as shown in FIG. 2(B). Specifically, the command field 24a is for arranging a command specifying either a request packet or a response packet while the version field 24b is for arranging a version of the RIP. The address family ID field 24c is for locating a protocol ID signal. Moreover, each of the IP address fields is for locating a destination network address or a host network address while each of the metric fields is for arranging a metric from each destination indicated in the IP address fields.

Incidentally, the FCS field 25 is for arranging a frame correction sequence used as a part of the Ethernet header field 21.

In FIG. 1 and FIGS. 2(A) and 2(B), an idle or an unused network address can be detected by monitoring the metric fields 24e–1 to 24e–n and the corresponding addresses 24d–1 to 24d–n, as will become clear later.

Figure 3:
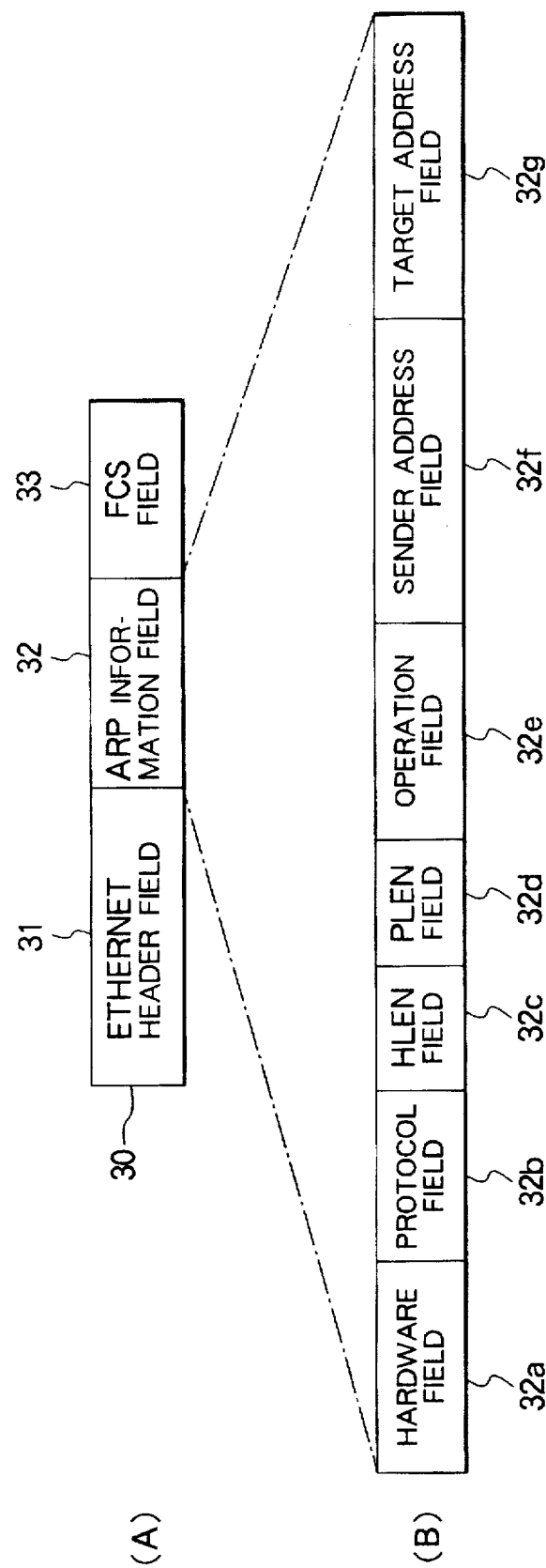
FIGS. 3(A) and 3(B) show formats for use in describing an address resolution protocol (ARP) packet.

Referring to FIGS. 3(A) and 3(B), the ARP packet 30 is transmitted from and received by the host station 10 shown in FIG. 1 in the manner to be mentioned later. The ARP packet illustrated in FIG. 3(A) has a format composed of an Ethernet header field 31, an ARP information field 32, and an FCS field 33.

The Ethernet header field 31 is for locating an information signal sequence used to establish the second layer, namely, the data link layer in the seven layer model of the OSI. To this end, the information signal sequence in the Ethernet header field 31 is structured by a frame which includes a destination address, a sender address, a protocol type, and the like.

As shown in FIG. 3(B), the APR information field 32 is subdivided into a hardware field 32a, a protocol field 32b, an HLEN field 32c, a PLEN field 32d, an operation field 32e, a sender address field 32f, and a target address field 32g. Specifically, the hardware field 32a is for arranging a hardware type of a hardware interface which is requested to send a reply or a response by a sender while the protocol field 32b is for arranging a protocol used. The HLEN field 32c is for locating a length of a physical hardware address while the PLEN field 32d is for arranging a length of a protocol address. The operation field 32e is for identifying an ARP request, an ARP response, or the like.

In addition, the sender address 32f is for arranging a hardware address of the sender and an IP address thereof. A combination of the hardware address and the IP address may be collectively called a network address. On the other hand, the target address 32g is for locating a hardware address of a receiver and an IP address thereof.

The FCS field is used as a part of the Ethernet header field 31 and is for arranging a frame correction sequence.

Referring to FIG. 4, the routing table 105 illustrated in FIG. 1 are exemplified which is divided into a destination network address region 105a, a Nexthop network address region 105b, an interface region 105c, and a metric region 105d. In FIG. 4, the destination network address region 105a stores a network address to which a packet is to be sent while the Nexthop network address region 105b stores a network address assigned to a network which allows a packet to pass therethrough during transmission of the destination network address. The interface region 105c is loaded with an interface number assigned to an interface used on transmission of the packet while the metric region 105d is loaded with a metric to the destination.

In FIG. 4, it is assumed that a packet is sent to a host station which has the destination network address of "133.200.1.1", in the destination network address region 105a. In this event, since the Nexthop network address region is loaded with "Direct", the packet is transmitted to its own interface, as depicted at "intf-1" in FIG. 4. Therefore, the metric to the destination is equal to "1".

On the other hand, let a packet be transmitted to a host station specified by the destination network address of "133.200.2.1" memorized in the destination network address region 105a. Inasmuch as the Nexthop network address region 105b is loaded with "133.200.1.199", the packet is transmitted through a station or network of "133.200.1.199" to the destination station of "133.200.2.1". In this case, the packet is given to the interface of intf-1 while the metric is equal to two.

Referring to FIG. 5, an example of the ARP table 106 is illustrated for a better understanding of this invention. As shown in FIG. 5, the ARP table 106 is divided into a destination network address region 106a for storing a network address to which a packet is to be transmitted and a destination MAC (Medium Access Control) address region 106b for storing a physical address to which the packet is to be sent.

It is assumed that a packet is transmitted to a host station of the destination network address "133.200.1.1". In this case, a destination MAC physical address necessary for the Ethernet header may be "00004c000001", as stored in the destination MAC address region 106b. Thus, the ARP table 106 serves to convert the network address into the physical address.

Figure 6:
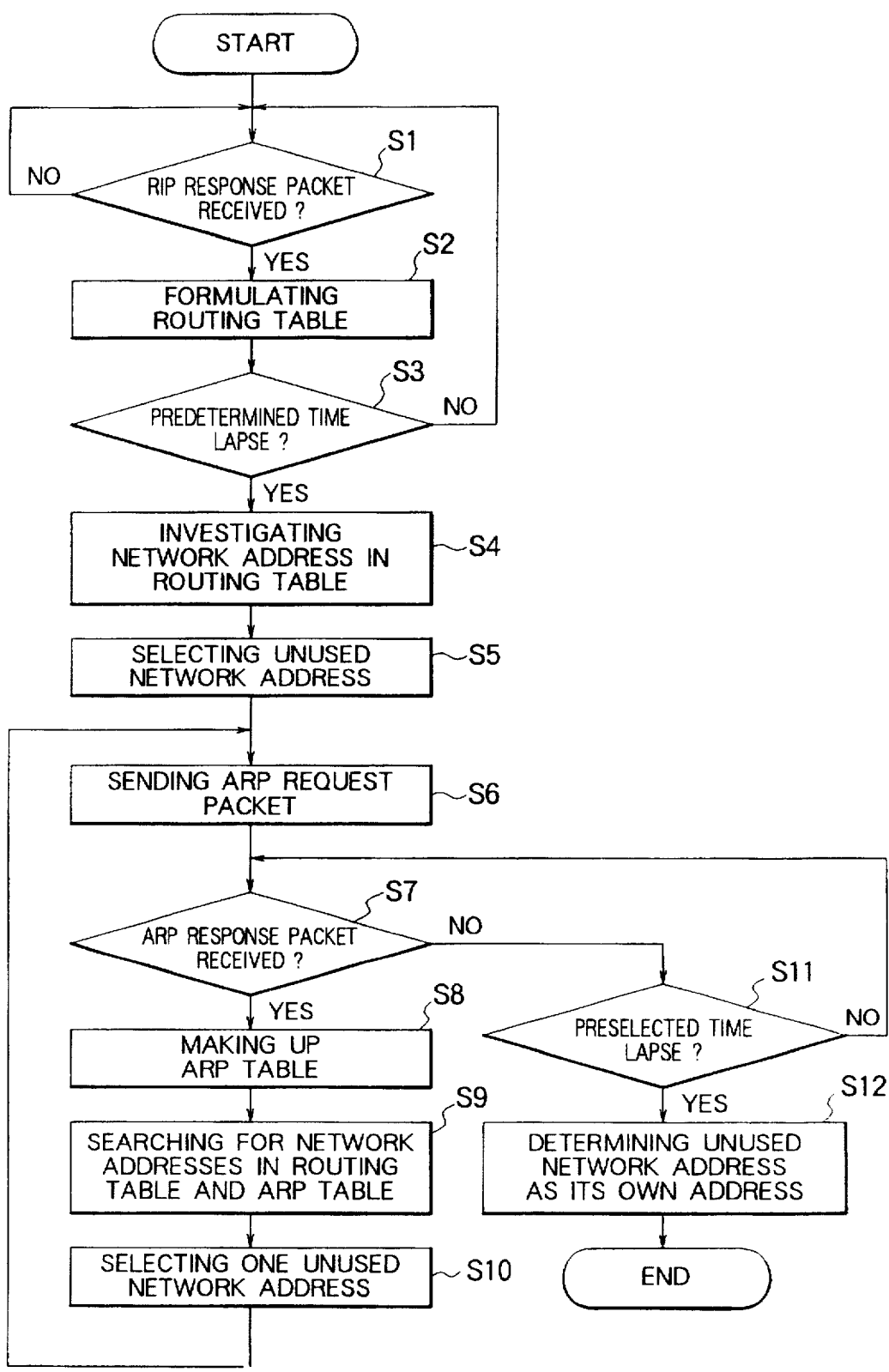
FIG. 6 shows a flow chart for use in describing operation of the automatic network address setting circuit illustrated in FIG. 1.

Referring to FIG. 6 together with FIGS. 1 through 5, description will be made about operation of the host station 10 in detail. When the operation is started, the host station 10 receives the RIP response packet, as shown in FIG. 6. The RIP response packet is supplied to the RIP receiver 102 through the LAN interface circuit 101. The controller 104 formulates a routing table information signal within a predetermined time interval of, for example, thirty seconds by referring to the sender network address of the received RIP response packet and the contents of the RIP information field 24 (first through third steps S1 to S3).

Specifically, the RIP receiver 102 judges at the first step S1 whether or not the RIP response packet is received. The controller 104 formulates or makes up the routing table information signal on the basis of the sender network address and the contents of the RIP information field 24 at the second step S2. The routing network table information signal is memorized in the routing table 105. Thereafter, the controller 104 monitors at the third step S3 whether or not the predetermined time interval lapses after reception of the RIP response packet.

Next, the controller 104 searches for the routing table 105 at a fourth step S4 to investigate the network addresses of the host stations directly connected to the LAN from the contents of the routing table 105 formulated on the basis of the RIP packet received within the predetermined time interval. In FIG. 4, the controller 104 extracts only the destination network addresses which are specified by "Direct" in the Nexthop network address region.

If unused network addresses are found from the routing table 105 by the controller 104, the controller 140 optionally selects, at a fifth step S5, two of the unused network addresses which will be called first and second provisional network addresses a and b, respectively. In FIG. 4, the first and the second provisional network addresses may be different from "133.200.1.1", "133.200.1.5", "133.200.1.10", "133.200.1.7", "133.200.1.99", and "133.200.1.199".

Herein, even when a host station exists which corresponds to the first provisional network address, it often happens that the RIP response packet which indicates existence or presence of the host station corresponding to the first provisional network address can not be received within the predetermined time interval. Under the circumstances, the first provisional network address might wrongly be determined as the unused network address.

Taking the above into consideration, the ARP request packet and the ARP response packet are used to verify or confirm whether or not the host station which corresponds to the first provisional network address is present on the LAN 11.

To this end, the ARP transceiver 103 forms an ARP packet with reference to the ARP table 106, as illustrated in FIGS. 3(A) and (B). In this event, the second provisional network address b is written into the sender address field 32f while the first provisional network address a is written into the target address field 32g. In addition, a request code is written into the operation field 32e. Such an ARP packet is sent or transmitted as the ARP request packet from the ARP transceiver 103 to the LAN 11 through the LAN interface circuit 101, as shown at a sixth step S6 in FIG. 6.

If a host station which has the provisional network address a written into the target address field 32g is present on the LAN 11, it sends an ARP response packet hack to the host station 10 illustrated in FIG. 1. In the ARP response packet, the first provisional network address a is written into the sender address field 32f while the second provisional network address is written into the target address field 32g. A response code is written into the operation field 32e.

When the ARP response packet is received through the LAN 11 by the host station 10 illustrated in FIG. 1, as shown at a seventh step S7, the ARP response packet is sent through the LAN interface circuit 101 and the ARP transceiver 103 to the controller 104. The controller 104 forms an ARP table information signal on the basis of the ARP response packet received by the ARP transceiver 103 and makes up the ARP table 106 illustrated in FIG. 1, as shown at an eighth step S8.

Subsequently, the controller 104 monitors the contents of the routing table 105 and the ARP table 106 and searches for network addresses connected direct to the host station 10 on the LAN 11, as shown at a ninth step S9. Unused network addresses are selected from the network addresses by the controller 104 at a tenth step S10 and one of the unused network addresses is determined as a third provisional network address c.

Under the circumstances, the ARP transceiver 103 sends a next ARP request packet to the LAN 11, as shown at the sixth step S6. In this case, the ARP request packet is structured by arranging the third provisional network address c in the sender address field 32f of the ARP packet (FIG. 3), by arranging the second provisional network address b in the target address field 32g, and by arranging the result code in the operation field 32e.

Like in the above, if an ARP response packet is received by the ARP transceiver 103 at the seventh step S7, the eighth through the tenth steps S8 to S10 are repeated in a manner similar to those mentioned before. Reception of the ARP response packet means that a host station of the network address b is present on the LAN 11.

From this fact, it is readily understood that, in the ARP response packet, the second provisional network address b is written into the sender address field 32f while the third provisional network address c is written into the target address field 32g with the response code kept in the operation field 32e.

On the other hand, when no ARP response packet is received by the ARP transceiver 103 and a preselected time interval lapses, as shown at an eleventh step S11, the controller 104 in the host station 10 determines the second provisional network address b as its own network address as a twelfth step S12.

As mentioned before, as long as the ARP response packet is received by the host station 10, similar operation is repeatedly carried out in the host station 10 until no ARP response packet is received by the host station 10.

Thus, the host station 10 mentioned before monitors the RIP response packet which is regularly or periodically transmitted through the LAN 11 and received by the host station 10. The contents of the received RIP response packet are memorized in the routing table 105 and investigated by the controller 104 so as to extract unused or idle network addresses on the basis of the routing table 105. When the unused or idle network addresses are found out, the ARP transceiver 103 and the controller 104 are operated so as to detect whether or not a host station which has the network address corresponding to the unused network address is present in the LAN 11 and to produce a result of the above-mentioned detection. The host station determines or sets its own address with reference to the result of the above-mentioned detection.

With this method, it is possible to automatically determine or set a network address within a short time without any address server when a new host station is added to an existing LAN.

According to this invention, a routing information signal which is periodically transmitted on the LAN is at first received in a host station to be memorized therein. Subsequently, unused or idle network addresses are detected and extracted from memorized contents. Confirmation is made about presence or absence of a host station which has the unused or idle network address one by one. By the use of a result of detection or confirmation, a network address of the host station is determined.

While this invention has thus far been described in conjunction with a preferred embodiment thereof, it will readily be possible for those skilled in the art to put this invention into practice in various other manners. For example, the routing information monitored by a host station may not be always the RIP packet while any other packets may be transmitted and received instead of the ARP packet. In addition, this invention is applicable to a network which may include either a single local area network or a plurality of local area networks. Moreover, it is needless to say that the present invention is not restricted to the Ethernet.

What is claimed is:

1. An automatic network address setting circuit included in a host station connected to a local area network to allocate said automatic network address setting circuit's own network address to said host station, said automatic setting circuit comprising:

routing information reception means for receiving a routing information signal transmitted through said local area network;

memory means for memorizing said routing information signal received through said routing information reception means;

extracting means for extracting an unused address with reference to contents of said routing information signal stored in said memory means to determine said unused address as an extracted address;

confirming means for confirming whether or not another host station assigned with said extracted address is present; and determining means for determining the own network address on the basis of a result of said confirmation.

2. An automatic network address setting circuit as claimed in claim 1, further comprising:

holding means for holding a result of confirmation sent from said confirming means; and deriving means for deriving the unused address on the basis of contents of the memory means and contents of said holding means.

3. An automatic network address setting circuit as claimed in claim 2, wherein said confirming means comprises:

transmitting means for transmitting a response request to the address extracted by said extracting means;

receiving means for receiving a response information signal in response to said response request;

judging means for judging whether or not a host station to which said address is assigned is present on the basis of reception status of said response information signal to produce a result of judgement and to output said result of judgement, as said confirmation result.

4. An automatic network address setting circuit as claimed in claim 3, wherein said confirming means comprises:

notifying means for notifying said determining means of absence of the host station which has the extracted address, when the response information signal is not received within a predetermined time duration.

5. A method of determining an assigned network address of a host station connected to a local area network, said method comprising the steps of:

monitoring a predetermined routing information signal which is periodically sent through said local area network and which carries routing information of said local area network;

selecting an unused network address on the basis of the predetermined routing information signal received; and deciding said assigned network address on the basis of said unused network address;

wherein said deciding step comprises the steps of:
transmitting a preselected request signal which carries said unused network address; and
confirming whether or not a preselected response signal is received by said host station in response to said preselected request signal to determine said unused network address as said assigned network address on no reception of said preselected response signal.

6. A method of determining an assigned network address of a host station connected to a local area network, said method comprising the steps of:

monitoring a predetermined routing information signal which is periodically sent through said local area network and which carries routing information of said local area network;

selecting an unused network address on the basis of the predetermined routing information signal received; and deciding said assigned network address on the basis of said unused network address;

wherein said monitoring step comprises the steps of:
receiving said predetermined routing information signal;
formulating a routing table on the basis of said routing information carried by said predetermined routing information signal; and
supervising said routing information in said routing table.

7. A method of determining an assigned network address of a host station connected to a local area network, said method comprising the steps of:

monitoring a predetermined routing information signal which is periodically sent through said local area network and which carries routing information of said local area network;

selecting an unused network address on the basis of the predetermined routing information signal received; and deciding said assigned network address on the basis of said unused network address wherein said selecting step comprises the steps of:
formulating an address table on the basis of said predetermined routing information signal to specify each network address previously assigned; and
extracting said unused network address on the basis of said address table.

8. A method of determining an assigned network address of a host station connected to a local area network, said method comprising the steps of:

monitoring a predetermined routing information signal which is periodically sent through said local area network and which carries routing information of said local area network;

formulating an address table on the basis of said predetermined routing information signal to-specify each network address previously assigned;

selecting two of unused network addresses with reference to said address table;

transmitting a preselected request signal which carries two of said unused network addresses one of which is included as a sender network address and the other of which is included as a target network address; and confirming whether or not a preselected response signal is received by said host station in response to said preselected request signal to determine said unused network address as said assigned network address on no reception of said preselected response signal.

9. A method as claimed in claim 8, wherein said predetermined routing information signal is received in the form of a routing information protocol (RIP) packet while said preselected request signal and said preselected response signal are transmitted and received in the form of an address resolution protocol (ARP) packet, respectively.

* * * * *